United States Patent [19]
Hendry et al.

[11] Patent Number: 5,536,346
[45] Date of Patent: Jul. 16, 1996

[54] METHOD FOR REPAIRING PUNCTURED TIRES

[76] Inventors: Robert A. Hendry, 1307 College St., SE., N. Canton, Ohio 44720; Charles L. Muhs, 7507 Stonecreek Rd., Newcomerstown, Ohio 43832

[21] Appl. No.: 539,508

[22] Filed: Oct. 6, 1995

Related U.S. Application Data

[62] Division of Ser. No. 286,677, Aug. 5, 1994, abandoned.

[51] Int. Cl.$^6$ .................................................. B29C 73/06
[52] U.S. Cl. ............................................. 156/97; 152/370
[58] Field of Search .............................. 156/97; 152/367, 152/370; 81/15.7

[56] References Cited

U.S. PATENT DOCUMENTS

| | | | |
|---|---|---|---|
| 466,169 | 12/1891 | Hume | 152/370 |
| 3,143,156 | 8/1964 | Fagert et al. | 152/370 |
| 3,277,642 | 10/1966 | Niconchuk | 57/164 |
| 3,282,320 | 11/1966 | Klouza | 152/370 |
| 3,426,826 | 2/1969 | Warsaw et al. | 152/370 |
| 4,399,854 | 8/1983 | DiRocco et al. | 152/370 |
| 4,548,102 | 10/1985 | DiRocco et al. | 81/15.7 |
| 4,710,249 | 12/1987 | Roberts | 156/64 |

FOREIGN PATENT DOCUMENTS 291568  11/1988  European Pat. Off. ............... 152/367

*Primary Examiner*—Geoffrey L. Knable
*Attorney, Agent, or Firm*—Sand & Sebolt

[57] ABSTRACT

A tire repair insert having a body defined by a pair of ends, a pair of parallel sides, and a pair of edges, with one of said edges being tapered from one of the ends to the other of the ends such that the cross-sectional area of the body increases from a minimum at one end, to a maximum at the other end. The body includes a pair of outer layers of semi-cured rubber, and an intermediate layer of semi-cured rubber. A layer of cured rubber is positioned between the intermediate layer and each of the outer layers. The rubber layers are free of any internal reinforcement and have an elongation factor of approximately 600%. In a method for repairing tires with the above described tire repair insert, a technician first observes the puncture within the tire. If the puncture is small, then the smallest cross-sectional portion of the tire repair insert is placed within an eye of an end slot needle. If the puncture is intermediate in size, then the tire repair insert is positioned within the eye of the end slot needle such that each of the ends is equidistance from the end slot needle. Lastly, if the puncture is large, than that portion of the tire repair insert having the largest cross-sectional area is inserted into the eye of the end slot needle. In this manner, when the needle and tire repair insert are inserted into the puncture, the mass of elastomeric sealing material extending into the puncture matches the puncture size and reduces the amount of force required for insertion of the insert into the puncture.

10 Claims, 4 Drawing Sheets

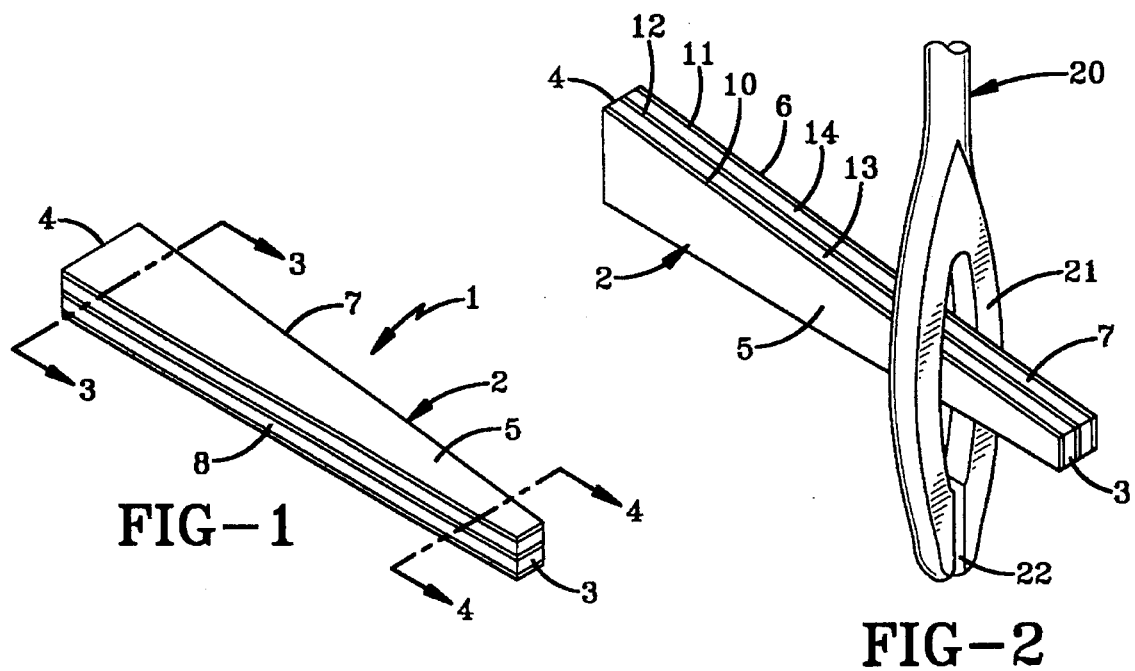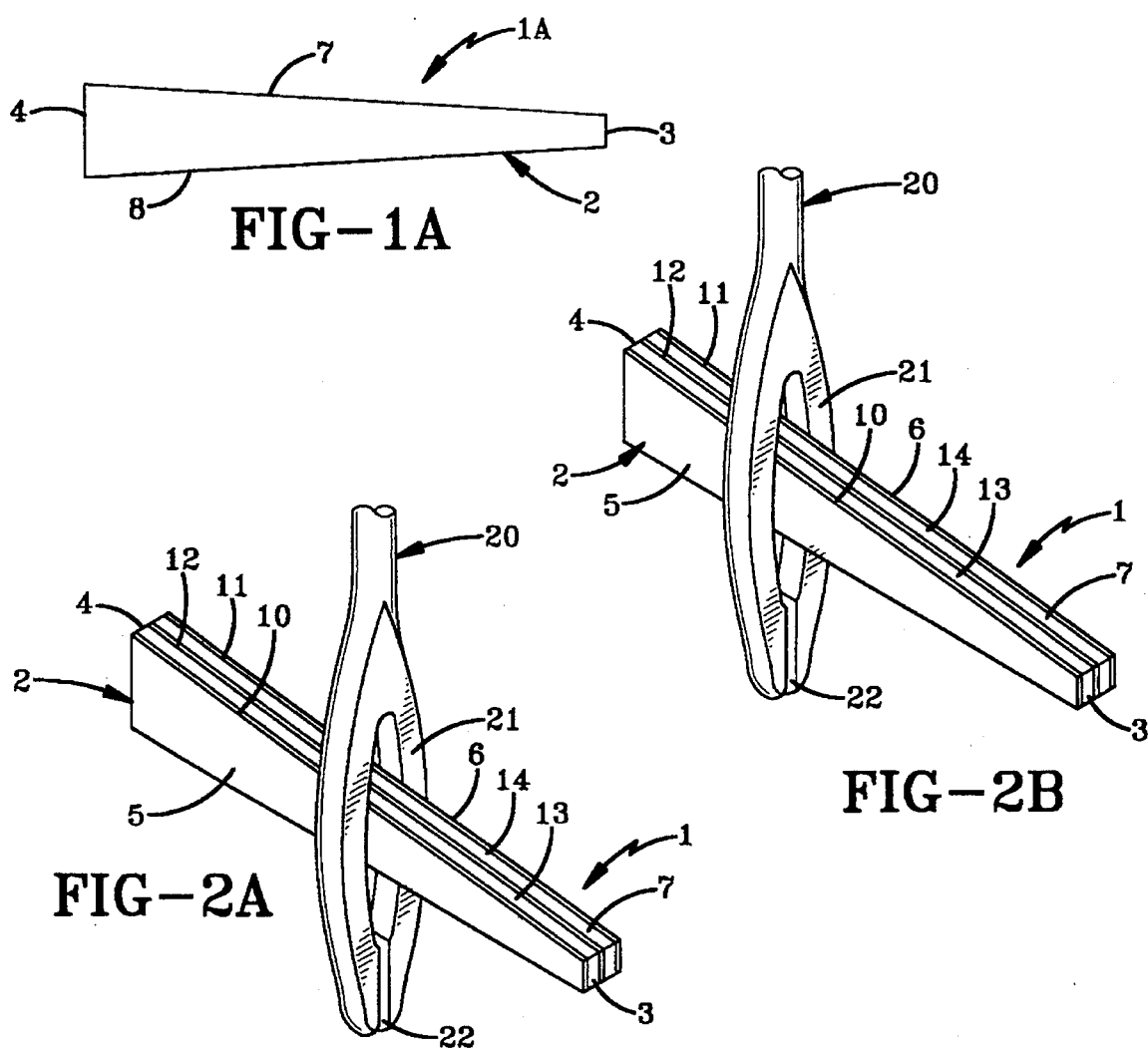

METHOD FOR REPAIRING PUNCTURED TIRES

This application is a division of application Ser. No. 08/286,677, filed Aug. 5, 1994, now abandoned.

BACKGROUND OF THE INVENTION

1. Technical Field

The present invention relates to tire repair. More particularly, the invention relates to a tire repair insert or plug as they are sometimes referred to in the tire repair industry, and to a method of repairing punctured tires. Specifically, the invention relates to a tire repair insert and method of repairing punctures in tires where the puncture assumes a variety of sizes and types which include, but are not limited to holes, cuts, star or X-breaks, and the tire repair insert is adaptable to the size of the puncture.

2. Background Information

As individuals and companies continue to search for new areas to reduce their expenses, tire repair has grown in popularity. If a pneumatic tire is punctured, it is significantly less expensive to repair the tire than to replace it. While repairing a punctured tire is less expensive than purchasing a new tire, the risk of air leakage around a tire repair insert is ever present. This risk is especially apparent for punctures that are smaller or larger than the tire repair insert. Repairing tires is also becoming more acceptable as society becomes increasingly concerned with the landfill dilemmas associated with discarded tires.

Tire repair inserts have been soft highly flexible bodies of an elastomeric material. In the common method of repair, an adhesive is applied to a thin smooth strip of soft, highly flexible, elastomeric material. The strip is then folded in half and forcibly elongated and inserted into a puncture. During the insertion of the strip into the puncture, the soft flexible material is substantially deformed to conform to the puncture. One problem associated with such prior art tire repair inserts is that the sealing effectiveness and repair reliability vary with differences in puncture size and shape. Also, when used with steel belted tires the steel cords will grasp, and tear the soft material preventing it from sufficiently entering the puncture and sealing the same.

Additionally, the use of many prior art repair products included the step of reaming the puncture hole to enlarge the hole to accept the tire repair insert. While reaming the hole often eliminates the problem associated with holes having varying size and shape, reaming necessarily requires the enlargement of the hole, further weakening the tire, and requiring the use of a larger, stronger tire repair insert.

Three well known tire repair inserts presently in use today, are shown in FIGS. 9–11 of the accompanying drawings. In use, all three inserts are inserted through the eye of an end slot needle, such that the ends of the insert are equal distance from the end slot needle. The needle is then forcibly inserted into the puncture and removed, leaving a portion of the insert within the puncture to seal the tire.

As should be apparent from a review of FIGS. 9–11, when the prior art tire repair inserts are inserted, the cross section of the portion extending into the puncture remains constant. While the above discussed tire repair inserts are presumably sufficient for the purpose which they are intended, the constant cross-sectional area of the insert has one drawback. If the puncture is somewhat smaller than the cross sectional area of the tire repair insert, the insert may be extremely difficult to force into the puncture and many times causes the insert to be cut upon insertion into the puncture. Alternatively, if the puncture is somewhat larger than the tire repair insert, then the puncture may not be adequately sealed.

While a variety of tire repair insert sizes may be manufactured and stocked to assure that the appropriate insert size is available for punctures of all sizes, stocking multiple size inserts increases the cost of tire repair, tire repair insert manufacture, and may cause confusion on the part of the repair technician.

Therefore, the need exists for an improved tire repair insert and method of repairing tires in which a single tire repair insert provides a range of cross-sectional areas such that a small cross-sectional area may be utilized to repair small punctures, a medium cross-sectional area of the same tire repair insert may be used to repair medium punctures, and a large cross-sectional area of the same insert may be used to repair large punctures in tires. This design also circumvents the frequent cutting of the insert by steel belt cords during insertion.

SUMMARY OF THE INVENTION

Objectives of the invention include providing an improved tire repair insert and associated method for repairing tires which greatly increases the quality, ease and reliability of the tire repair.

Another objective of the invention is to provide such a tire repair insert with a varied cross-sectional area, such that a small cross-sectional area may be utilized to repair a small puncture, and a large cross-sectional area may be used to repair a large puncture.

Yet another objective of the invention is to provide a tire repair method wherein a technician can accurately determine the cross-sectional area necessary to affect a puncture repair, and then select only that portion of the tire repair insert for insertion into the puncture.

A still further objective of the invention is to provide such a tire repair method which provides one tire repair insert for use in punctures having a variety of sizes and configurations.

A still further objective of the invention is to provide such a tire repair method wherein the amount of force required to be applied on a tire repair insert by the technician to insert it into the tire remains constant, regardless of the puncture size.

A further objective of the invention is to provide a device which is of a relatively simple construction, which achieves the stated objectives in a simple, effective and inexpensive manner and which solves problems and satisfies needs existing in the art.

These and other objectives and advantages of the invention are obtained by the tire repair insert of the present invention, the general nature of which may be stated as including a body of resilient elastomeric material defined by a pair of spaced apart ends, a pair of spaced apart sides, and a pair of edges, at least one of said edges being tapered from one of said ends to the other of said ends such that the cross-sectional area of said body increases from a minimum at said one end to a maximum at said other end.

These and other objectives and advantages of the present invention are also obtained by the method for repairing tires, the general nature of which may be stated as including the steps of visually inspecting a puncture within a tire to determine the puncture size; placing a tire repair insert having a tapered cross-sectional area into an eye of a needle; positioning the tire repair insert within said eye such that the cross-sectional area of said repair insert corresponds to the puncture size; forcing said needle into said puncture at least a distance sufficient to assure that said tire repair insert extends through said tire; and removing said needle from said tire while simultaneously leaving said tire repair insert within said puncture hole.

BRIEF DESCRIPTION OF THE DRAWINGS

Preferred embodiments of the invention, illustrative of the best modes in which applicants have contemplated applying the principles, are set forth in the following description and are shown in the drawings and are particularly and distinctly pointed out and set forth in the appended claims.

FIG. 1 is a perspective view of a first embodiment of the tire repair insert of the present invention;

FIG. 1A is a top plan view of a second embodiment of the insert of the present invention;

FIG. 2 is a perspective view of the tire repair insert of FIG. 1, shown in a first position in the eye of an end slot needle;

FIG. 2A is a perspective view of the tire repair insert of FIG. 1, shown in a second position in the eye of an end slot needle;

FIG. 2B is a perspective view of the tire repair insert of FIG. 1, shown in a third position in the eye of an end slot needle;

Similar numerals refer to similar parts throughout the drawings.

DESCRIPTION OF THE PREFERRED EMBODIMENT

Figure 3:
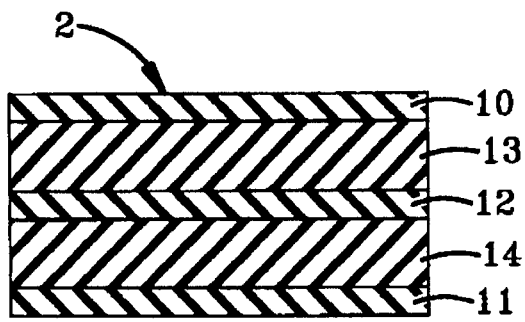
FIG. 3 is an enlarged sectional view taken on line 3—3, FIG. 1.
Figure 4:
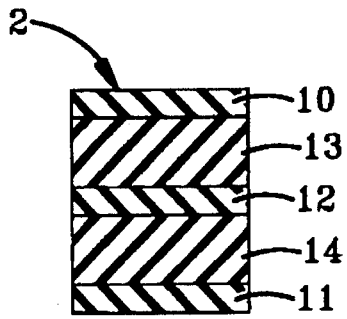
FIG. 4 is an enlarged sectional view taken on line 4—4, FIG. 1.

A first embodiment of the improved tire repair insert of the present invention is indicated generally at 1, and is illustrated in FIG. 1. Tire repair insert 1 includes a body indicated generally at 2, having a generally constant, uniform thickness, terminating in a pair of spaced apart ends 3 and 4. Body 2 also includes first and second spaced apart parallel sides 5 and 6, and edges 7 and 8. In the first embodiment, edge 8 is substantially perpendicular to ends 3 and 4, and edge 7 is tapered with respect to edge 8 such that the cross-sectional area of body 2 increases from a minimum at end 3 to a maximum at end 4 as can be seen in FIGS. 3 and 4. In a second embodiment 1A, (FIG. 1A), both edges 7 and 8 extend at an angle from end 4 to end 3 forming a symmetrical, generally V-shaped body and form included acute angles with the ends, which angles are substantially equal. In both embodiments, the thickness of the body remains substantially constant.

Body 2 includes a pair of parallel and spaced apart outer layers 10 and 11 and an intermediate layer 12. Layers 0, 11 and 12 preferably are made of semi-cured rubber or an elastomeric material for purposes which will be described in detail hereinbelow. A first cured layer 13 of an elastomeric or rubber material is interposed between outer layer 10 and intermediate layer 12, and a second cured layer 14 of rubber is interposed between outer layer 11 and intermediate layer 12. Cured layers 13 and 14 are made of cured, non-reinforced rubber, having an extremely high sheer resistance. Moreover, layers 10–14 are free of internal fiber reinforcement and will elongate up to generally 600% under sufficient force.

In the preferred embodiments, inserts 1 and 1A will have a length of approximately 57 mm and a constant thickness of 4 mm, with ends 3 and 4 having a length of 3.5 mm and 9.5 mm, respectively.

Turning to the method of repairing tires and installing tire repair insert 1 in a punctured tire, insert is first oriented to the position shown in FIG. 2. An end slot needle 20 having an eye 21 and an end slot 22 is used to install tire repair insert 1. In the preferred embodiment, the combined thickness of outer layers 10 and 11, intermediate layer 12, and cured layers 13 and 14 is slightly larger than the width of eye 21 of needle 20 to assure that the insert is slightly compressed when inserted into the needle to retain it therein.

Figure 7:
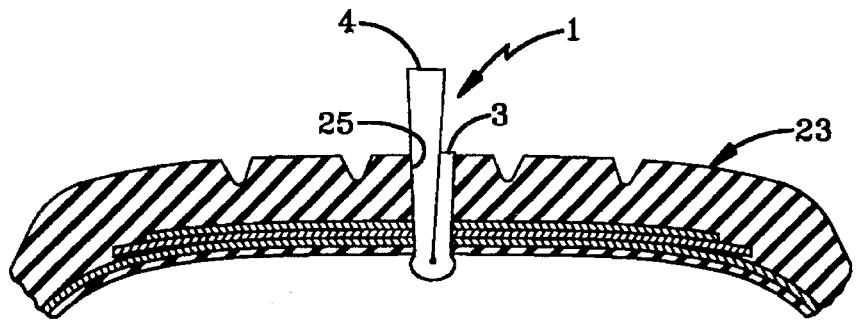
FIG. 7 is a fragmentary radial cross-sectional view taken through a typical vehicle tire having a small puncture, which has been repaired with the improved tire repair insert.
Figure 8:
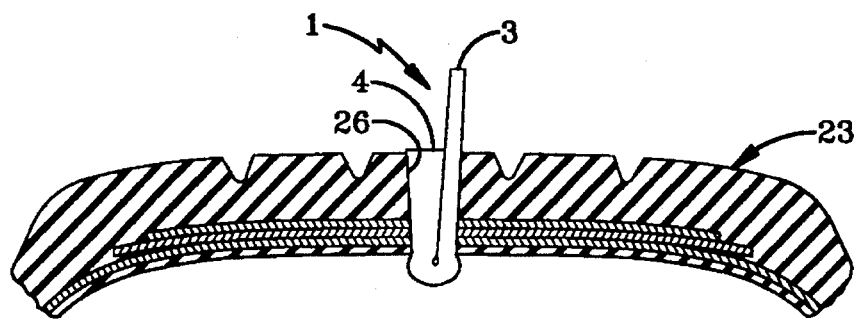
FIG. 8 is a fragmentary radial cross-sectional view taken through a typical vehicle tire having a large puncture, which has been repaired with the improved tire repair insert.

The first step in repairing a tire with insert 1, is to determine the puncture size. A typical tire 23 is shown in cross-section in FIG. 5, having a typical medium puncture 24, in the range of 4–5 millimeters. FIG. 7 shows a typical tire 23 having a small puncture 25 in the range of 2–3 millimeters, and FIG. 8 shows a typical tire 23 having a large puncture 26 in the range of 6–7 millimeters. Although punctures 24–26 are shown as smooth cylindrical holes extending normal to the tread, they may enter the tire diagonally and have various internal configurations and be jagged and rough.

Once the puncture size is determined, for example if a relatively small puncture 25 in the range of 2–3 millimeters is observed, that portion of the tire repair insert having the smallest cross sectional area adjacent end 3, is inserted into eye 21 of end slot needle 20 as best shown in FIG. 2.

If a medium size puncture 24, in the range of 4–5 millimeters is observed, then the center of tire repair insert 1, having a cross-sectional dimension intermediate that of ends 3 and 4, is positioned within eye 21 such that ends 3 and are equidistant from end slot needle 20 as shown in FIG. 2A. Similarly, if a large puncture 26 in the range of 6–7 millimeters is observed, then end 4 having a larger cross-sectional area is positioned adjacent end slot needle 20 as shown in FIG. 2B.

Figure 5:
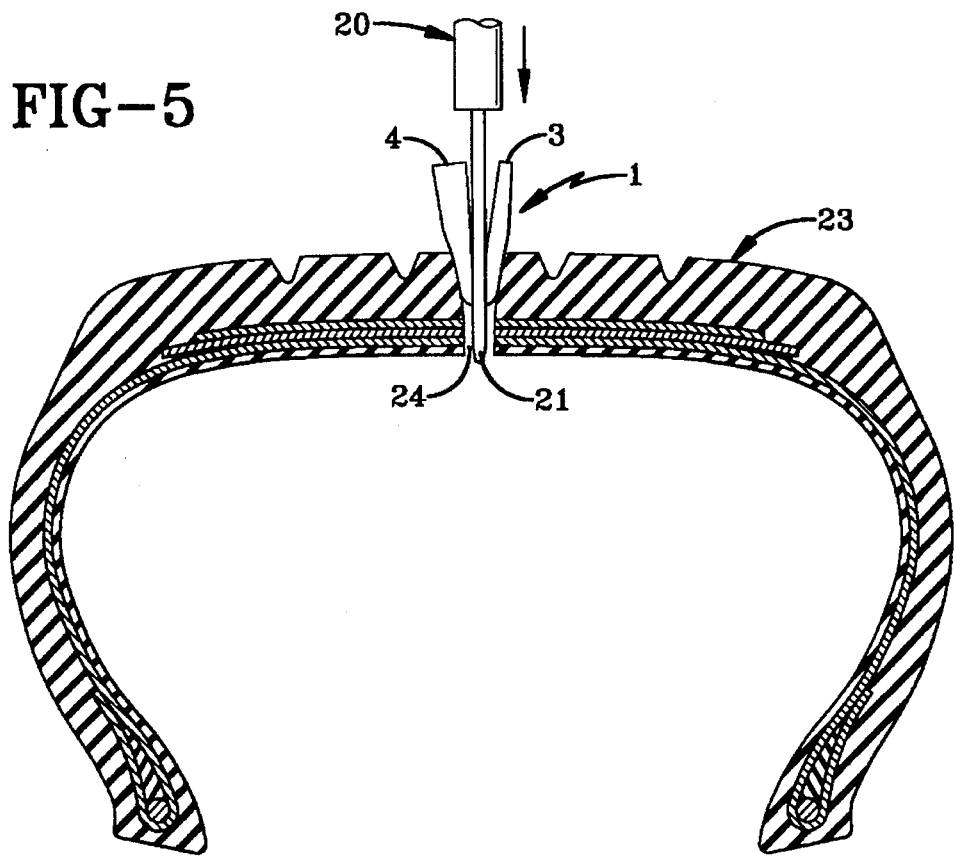
FIG. 5 is a radial cross-sectional view taken through a typical vehicle tire, showing the insertion of the tire repair insert of the present invention into a medium puncture from the exterior of the tire.
Figure 5A:
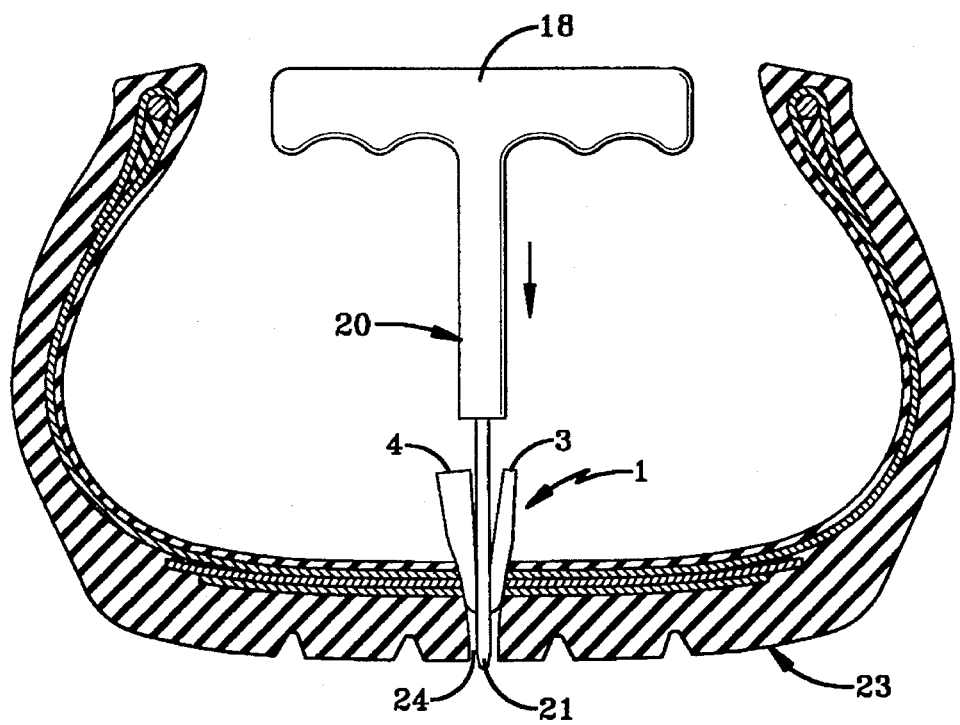
FIG. 5A is a radial cross-sectional view taken through a typical vehicle tire, showing the insertion of the tire repair insert of the present invention into a medium puncture from the interior of the tire.

Once the puncture size has been determined, and tire repair insert 1 has been appropriately positioned within eye 21 of end slot needle 20, then adhesive is applied to one or both of the puncture and tire repair insert 1. In the preferred embodiment, the adhesive includes accelerators which aid in the vulcanization of outer layers 10 and 11 and inner layer 12, when tire repair insert 1 is installed in a puncture. Referring specifically to FIG. 5, once the adhesive is applied, the end slot needle 20 and tire repair insert 1 are forcibly inserted into puncture 24 by pressing downwardly on handle 18 of needle 20 as shown in FIG. 5A. As insert 1 is inserted into puncture 24, it will elongate to as much as 600% its original length. End slot needle 20 is forced through puncture 24 until a portion of insert 1 extends entirely through the tire to create a bulbous end 27 as shown specifically in FIG. 6. Bulbous end 27 is created after passing through the puncture due to the contraction of the rubber which has been stretched considerably during its insertion through puncture 24 as the tire repair insert is bent into a U-shaped configuration within puncture 24.

The next step in repairing a tire with tire repair insert 1, is to withdraw end slot needle 20 from puncture 24. Once the technician begins to withdraw end slot needle 20 from the puncture, insert 1 will relax, expand, and apply pressure outwardly against tire 23. This outward pressure creates a positive frictional engagement between tire 23 and insert 1 which is sufficient to retain tire repair insert 1 within puncture 24 as end slot needle 20 is withdrawn. As a force is applied to needle 20, repair insert 1 passes through end slot 22 of needle 20 enabling the needle to be withdrawn leaving insert 1 within the puncture.

Inasmuch as the adhesive contains accelerators, the semi-cured outer layers 10 and 11 and intermediate layer 12 will begin to cure as a result of the accelerator. Moreover, the heat generated in the tire through use will further vulcanize semi-cured layers 10, 11 and 12 to firmly secure the repair insert within the puncture,.

Figure 6:
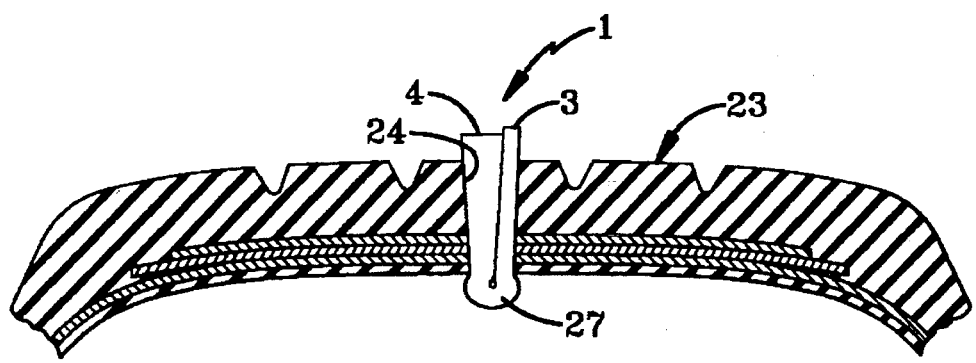
FIG. 6 is a fragmentary radial cross-sectional view taken through a typical vehicle tire which has been repaired with the improved tire repair insert from the exterior of the tire.
Figure 6A:
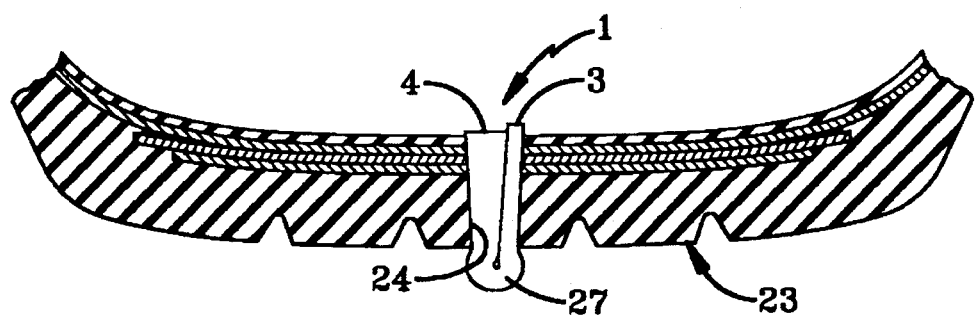
FIG. 6A is a fragmentary radial cross-sectional view taken through a typical vehicle tire which has been repaired with the improved tire repair insert from the interior of the tire.

As should also be apparent to one of ordinary skill in the art, tire repair insert 1 may be inserted exteriorly through the tread portion as shown specifically in FIGS. 5 and 6, or alternatively, may be inserted from the interior of the tire toward the tread portion as shown specifically in FIGS. 5A and 6A without departing from the spirit of the present invention.

Referring specifically to FIG. 7, if a relatively small puncture 25 is observed in tire 23, tire repair insert 1 is placed within eye 21 of needle 20 in the position shown in FIG. 2 as discussed above. This will require only a relatively small amount of material be inserted through the puncture, thereby lessening the amount of force which must be manually applied on needle handle 18 by the repairman. After insertion into puncture 25, insert 1 assumes the configuration shown in FIG. 7. Specifically, end 3 which has a small cross section, is positioned adjacent the outer tread surface of tire 23, and end 4, having a significantly larger cross sectional area, extends away from the tire tread, and will be trimmed away and discarded and need not be forced into the puncture as in prior tire repair inserts.

Referring to FIG. 8, if a repairman observes a larger puncture 26, for example in the range of 6–7 millimeters, then insert 1 will be positioned within eye 21 of needle 20 as shown in FIG. 2B. In this situation, end 4, having a large cross-sectional area, will be inserted into puncture 26 providing a greater amount of rubber to fill the larger puncture. The amount of force required to insert the rubber into puncture 26 will be approximately equal to that required to insert the insert into puncture 25 since the amount of inserted material will closely match the size of the puncture. End 3 of repair insert 1 will extend away from tire 23 and will then be trimmed away and discarded as waste.

Similarly, if a repairman observes a medium puncture, in the range of 4–5 millimeters (FIGS. 5 and 6), then insert 1 will be positioned within eye 21 of needle 20 as shown specifically in FIG. 2A, again only requiring the repairman to insert enough rubber into the puncture to effectively seal the same. In this situation, ends 3 and 4 both remain generally adjacent the tire tread, as the intermediate portion of insert 1 is utilized to affect the tire repair.

The repairman preferably adds an intermediate step to the tire repair process by utilizing a standard reaming tool to clean out the puncture, insert cement into the injury and also to hold the generally cylindrical shape of the puncture to more easily accept tire repair insert 1.

In summary, the tapered configuration of tire repair insert 1 permits a repairman to utilize a single tire repair insert to repair tires having punctures of various sizes, for example in the range of 2–7 millimeters. Further, repair tapered insert 1 allows the repairman to use only that portion of the tire repair insert which matches the size of the puncture to be repaired thereby greatly facilitating the insertion of the insert into the puncture due to the tapered configuration of the insert, not possible with existing tire repair inserts.

Figure 9:
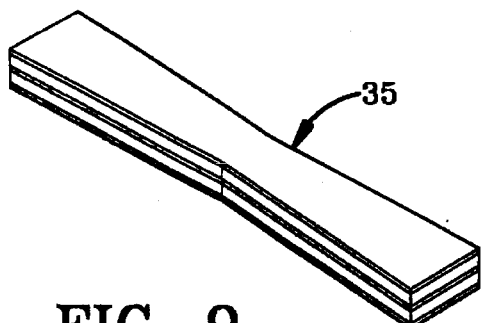
FIG. 9 is a perspective view of a first prior art tire repair insert.
Figure 10:
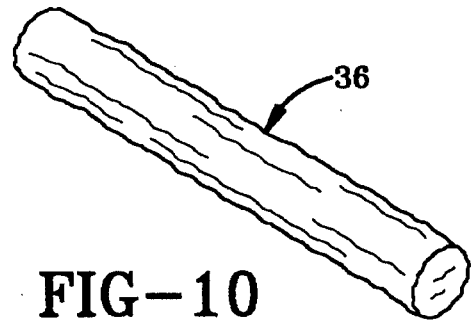
FIG. 10 is a perspective view of a second prior art tire repair insert.
Figure 11:
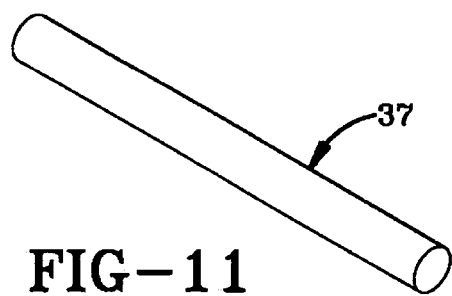
FIG. 11 is a perspective view of a third prior art tire repair insert.

Referring specifically to FIGS. 9–11, three prior art tire repair inserts are shown. In each of these designs, a body is provided having a pair of ends. Each prior art tire repair insert is inserted into the eye of a needle such that the ends are equal distance from each other. These prior art tire repair inserts presumably are adequate for the purpose for which they are intended, but do not provide a body having a varied cross-section such that the technician may accurately match the amount of rubber mass to be inserted into the puncture as in the present invention, simply by altering the position of the tire repair insert in eye 21 of end slot 20.

Prior art insert 35 (FIG. 9) is similar in makeup to that of insert 1 in that it includes the five material layers. However, it has a "bow-tie" configuration where both ends are of the same size and it does not provide for selective placement within the eye of a needle enabling the amount of rubber inserted into the puncture to match the puncture size. A large amount of manually applied pressure is required to force insert 35 into a small puncture and medium size puncture.

Prior art insert 36 (FIG. 10) is referred to in the tire repair industry as a "string insert" and is formed from fibrous material impregnated with a sealing material. Such an insert and its method of use is described in U.S. Pat. No. 3,277, 642. Again, these string inserts cannot be customized to the size of the puncture as is the insert of the present invention, and they require substantial pressure for forcing them into small punctures.

Prior art insert 37 (FIG. 11) is a smooth cylindrical body of press cured rubber having a large amount of elongation and provides an effective seal when inserted into a puncture. Insert 37 is inserted relatively easily into most punctures due to its large elongation. However, this insert is easily torn and often destroyed during insertion by the steel cords in a steel belted tire. This tearing problem is substantially reduced by the fiber reinforcement of insert 36, but requires greater force for its insertion into smaller and medium punctures.

Accordingly, the improved tire repair insert is simplified, provides an effective, easy to use, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved tire repair insert, and method for repairing tires is constructed and used, the characteristics of the construction, and the advantageous, new and useful results obtained; the new and useful structures, devices, elements, arrangements, parts and combinations, are set forth in the appended claims.

We claim:

1. A method of repairing a puncture within a tire comprising the steps of:

visually inspecting a puncture within a tire to determine the puncture size;

placing a tire repair insert having a cross-sectional area that tapers from a maximum at a first end to a minimum at an opposite second end into an eye of a needle;

positioning the tire repair insert within said eye such that the cross-sectional area of said repair insert corresponds to the puncture size;

forcing said needle into said puncture at least a distance sufficient to assure that said tire repair insert extends through said tire; and removing said needle from said tire while simultaneously leaving said tire repair insert within said puncture hold.

2. A method as defined in claim 1 in which said needle is inserted into said puncture from an exterior of said tire.

3. A method as defined in claim 1 in which said needle is inserted into said puncture from an interior of said tire.

4. A method as defined in claim 1 comprising the further steps of:

locating the second end of the insert having the minimum cross-sectional area more closely adjacent the needle than the first end of the insert having the maximum cross-sectional area; and forcing said second end of the insert into the puncture a sufficient distance to assure that said second end extends into said puncture.

5. A method as defined in claim 4 in which said second end repairs punctures in the range of 2–3 millimeters.

6. A method as defined in claim 1 comprising the further step of:

locating the first end of the insert having the maximum cross-sectional area more closely adjacent the needle than the second end of the inset having the minimum cross-sectional area; and forcing said first end of the insert into the puncture a sufficient distance to assure that said first end extends into said puncture.

7. A method as defined in claim 6 in which said first end repairs punctures in the range of 6–7 millimeters.

8. A method as defined in claim 1 comprising the further step of reaming the puncture prior to forcing said needle into the puncture.

9. A method as defined in claim 1 comprising the further step of elongating said insert while said needle is being forced into the puncture.

10. A method as defined in claim 1 including the step of applying an accelerator to said tire repair insert before insertion into said puncture.

* * * * *